J. GROPP.
Process for Fining Beer.
No. 214,648.   Patented April 22, 1879.
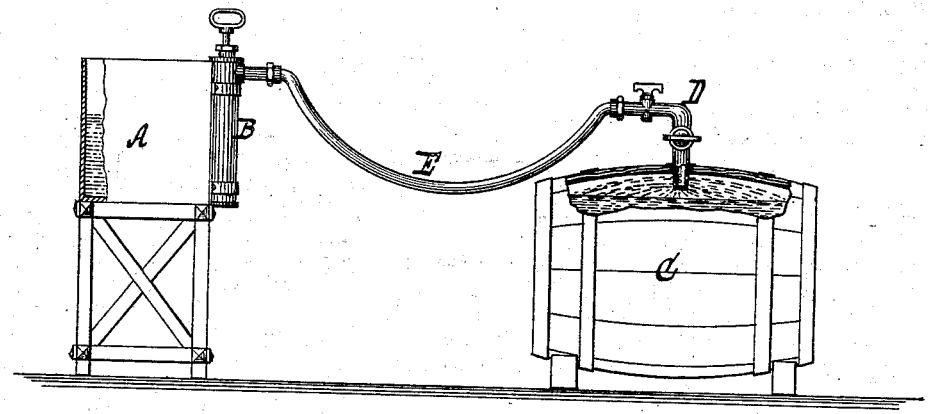
Witnesses
Otto Hufeland
William Miller.
Inventor.
John Gropp
by
Van Santvoord & Hauff
his attys.

UNITED STATES PATENT OFFICE.

JOHN GROPP, OF NEW YORK, N. Y.

IMPROVEMENT IN PROCESSES FOR FINING BEER.

Specification forming part of Letters Patent No. 214,648, dated April 22, 1879; application filed March 12, 1879.

*To all whom it may concern:*

Be it known that I, JOHN GROPP, of the city, county, and State of New York, have invented a new and Improved Process of Fining Beer, which invention is fully set forth in the following specification, reference being had to the accompanying drawing, which represents a side view, partly in section, of an apparatus used in carrying out my invention.

The usual process of fining beer consists in introducing the finings to the cask containing the beer by means of a funnel. During this procedure portions of the finings are liable to be spilled and lost; and since the finings are dropped altogether at one spot, it is necessary to stir the beer in order to diffuse the finings throughout the same, which operation obviously is a difficult one, and also has a bad effect on the beer.

The aim of my invention is to facilitate the diffusion of the finings in a cask of beer to avoid agitation of the same; and consists in spreading or spraying the requisite amount of the material into the barrel or cask over the surface of the beer through the medium of a suitable device, so that the finings are evenly distributed over the beer upon their introduction into the barrel or cask.

In carrying out my invention I store the finings, usually consisting of isinglass and vinegar or hard beer, in a tank, A, to which is connected the receiving end of a pump, B, and drive into the bung-hole of the cask C, containing the beer, a spigot or nozzle, D, the inner or discharge end of which is perforated in such a manner that the same is adapted to discharge in an inner and a lateral direction. I then connect this spigot to the discharge end of the pump B by means of a tube, E. Hence, by simply working the pump B, the requisite quantity of finings can be forced into the cask C and spread uniformly over the surface of the beer, as indicated, the same being diffused in fine particles through the turbid liquid, and carrying down with them in their precipitation the floating vegetable matters.

I am thus enabled to effect a proper introduction and admixture of the finings without disturbing the beer, and without the inconvenience or difficulty attending the old method.

What I claim as new, and desire to secure by Letters Patent, is—

In fining beer, the process of introducing the fining material into the beer cask or barrel, whereby agitation of the beer is avoided, which consists in spreading or spraying the requisite amount of the material into the barrel or cask over the surface of the beer, substantially as and for the purpose specified.

In testimony that I claim the foregoing I have hereunto set my hand and seal this 4th day of March, 1879.

JOHN GROPP. ·[L. S.]

Witnesses:
W. HAUFF,
E. F. KASTENHUBER.